United States Patent
Tu et al.

(10) Patent No.: US 10,187,962 B1
(45) Date of Patent: Jan. 22, 2019

(54) FLORAL LIGHTING SYSTEM

(71) Applicant: Jia-Jin Tu, New Taipei (TW)

(72) Inventors: Jia-Jin Tu, New Taipei (TW); Ju-Ping Chen, New Taipei (TW)

(73) Assignee: Jia-Jin Tu, New Taipei (TW)

( * ) Notice: Subject to any disclaimer, the term of this patent is extended or adjusted under 35 U.S.C. 154(b) by 0 days.

(21) Appl. No.: 15/882,602

(22) Filed: Jan. 29, 2018

(51) Int. Cl.
*H05B 37/02* (2006.01)
*H05B 33/08* (2006.01)
*F21S 9/02* (2006.01)
*A47G 7/04* (2006.01)
*H02J 7/02* (2016.01)
*F21Y 115/10* (2016.01)
*H02J 50/10* (2016.01)

(52) U.S. Cl.
CPC ......... *H05B 37/0272* (2013.01); *A47G 7/041* (2013.01); *F21S 9/02* (2013.01); *H05B 33/0863* (2013.01); *F21Y 2115/10* (2016.08); *H02J 7/025* (2013.01); *H02J 50/10* (2016.02)

(58) Field of Classification Search
CPC ........ H05B 37/0272; A47G 7/041; F21S 9/02
See application file for complete search history.

(56) References Cited

U.S. PATENT DOCUMENTS

| 5,063,485 A | 11/1991 | Harris |
| D453,390 S | 2/2002 | Bovee |
| 2005/0168973 A1* | 8/2005 | Chuang ................. A41G 1/005 362/122 |
| 2009/0084032 A1* | 4/2009 | Beeman .................. A01G 5/06 47/39 |

* cited by examiner

*Primary Examiner* — Anne M Hines
(74) *Attorney, Agent, or Firm* — Muncy, Geissler, Olds & Lowe, P.C.

(57) ABSTRACT

A floral lighting system that combines creative floral arrangements with lights is revealed. The floral lighting system includes a carrier, at least one floral unit, at least one light emitting diode (LED) module and a power supply. The floral unit is connected to the carrier to form a creative floral arrangement. The LED module includes at least one wire unit that is wound around or inserted into the floral unit for integrally connected to the floral unit. An external electronic device is used to control functions of the LED module such as light color, power on/off, lighting pattern, etc. wirelessly so that the LED module arranged at the creative floral arrangement on the carrier provides various kinds of dynamic lighting. The floral lighting system overcomes the shortcomings of conventional flower lights such as limited styles, dull lighting, etc.

9 Claims, 8 Drawing Sheets

FLORAL LIGHTING SYSTEM

BACKGROUND OF THE INVENTION

Field of the Invention

The present invention relates to a lighting system, especially to a floral lighting system that combines creative floral arrangements with LED lights.

Description of Related Art

There are flower lights formed by combination of flowers with lights available now. Refer to U.S. D453,390, a flower light is formed by an artificial flower (such as dandelion) connected to a light. However, the shape and style of the flower light revealed in U.S. D453,390 is fixed after production at the manufacturer's end so that clients (consumer's end) are unable to change or select flower types or lighting patterns. Also refer to U.S. Pat. No. 5,063,485, an illuminated artificial floral arrangement is revealed. A platform is secured within a hollow container and a plurality of artificial flowers is inserted through the platform. A plurality of low voltage lamps is wound about the artificial flowers or stems by electrical leads. The electrical leads are extended from a terminal block, through the container and connected to a standard electrical outlet. However, the illuminated artificial floral arrangement including the low voltage lamps, the style of the electrical leads, the artificial flowers, the hollow container and the terminal block has a fixed style after being produced by manufacturers (the manufacture's end). While in use, clients (the consumer's end) are unable to change or select either the hollow container or connection ways of the electrical leads. Thus these prior arts can't meet customers' needs for novelty and variety.

The conventional flower lights are not only having monotonous appearance, but also unable to be adjusted or modified according to clients' needs or preferences. There is only a few lighting patterns such as power on/off or flashing. Thus the flower lights unable to attract consumers or increase their purchase intention are going to be eliminated. There is room for improvement and there is a need to provide novel design of the flower lamps.

SUMMARY OF THE INVENTION

Therefore it is a primary object of the present invention to provide a floral lighting system that combines creative floral arrangements with lighting for showing various flowers and providing different kinds of dynamic lighting.

It is another object of the present invention to provide a floral lighting system that combines creative floral arrangements with lighting in which the flower types, the amount of flowers and the disposition of floral units of the creative floral arrangements can be selected or designed according to the florist's (manufacturer's end) creative concept, the client's (consumer's end) needs or their personal preferences. Thereby the variety or special characters of the creative floral arrangements can be increased. Thus the present system can not only solve the problems of limited shapes and dull lighting of conventional flower lights but also meet customers' needs for novelty and variety.

It is a further object of the present invention to provide a floral lighting system combining creative floral arrangements with lighting in which the creative floral arrangements and/or the lights are first designed and manufactured by florists according to the client's requirements and then the system generated is used by the clients. Thus a service module or a trading scheme for periodic replenishment/maintenance of the creative floral arrangements/the floral lighting system can be set up between florists and clients. For example, florists help clients to maintain normal operation of the floral lighting system or renew the creative floral arrangements periodically according to the clients' needs. The renewal means to change flower types, the amount of the flowers or the disposition of the floral unit. The colors and/or the lighting patterns of the LED module can also be modified.

In order to achieve the above objects, a floral lighting system according to the present invention includes a carrier, at least one floral unit, at least one light emitting diode (LED) module, and a power supply. The carrier includes a mounting space therein and a loading portion is formed in the mounting space. The floral unit includes real flowers or artificial flowers. The bottom of the floral unit is arranged at and fixed on the loading portion of the carrier by florists (manufactures) or clients (consumers) so that the floral unit is displayed through the mounting space of the carrier. The floral unit is used in combination with the carrier to form a creative floral arrangement. The LED module is disposed on the loading portion of the carrier and including at least one LED, at least one power supply unit for providing electricity the LED requires to emit light, at least one wireless control unit that allows clients/or consumers to control various functions of the LED module including light color, power on/off and lighting pattern wirelessly by using an external electronic device, and at least one wire unit connected between the power supply unit and the LED. The power supply provides power to the power supply unit of the LED module. The wire unit of the LED module is wound around or inserted into the floral unit to be integrally connected to the floral unit. The functions of the LED module including light color, power on/off and lighting pattern can be controlled wirelessly by the florist (manufacturer's end) or the client (the consumer's end) that operates the electronic device outside the floral lighting system. Thereby different kinds of dynamic lighting and visual effects are provided by the floral lighting system that combines light form at least one LED module with at least one creative floral arrangement.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein:

FIG. 2A is a partial enlarged view of the embodiment in FIG. 2 according to the present invention;

DETAILED DESCRIPTION OF THE PREFERRED EMBODIMENT

Figure 1:
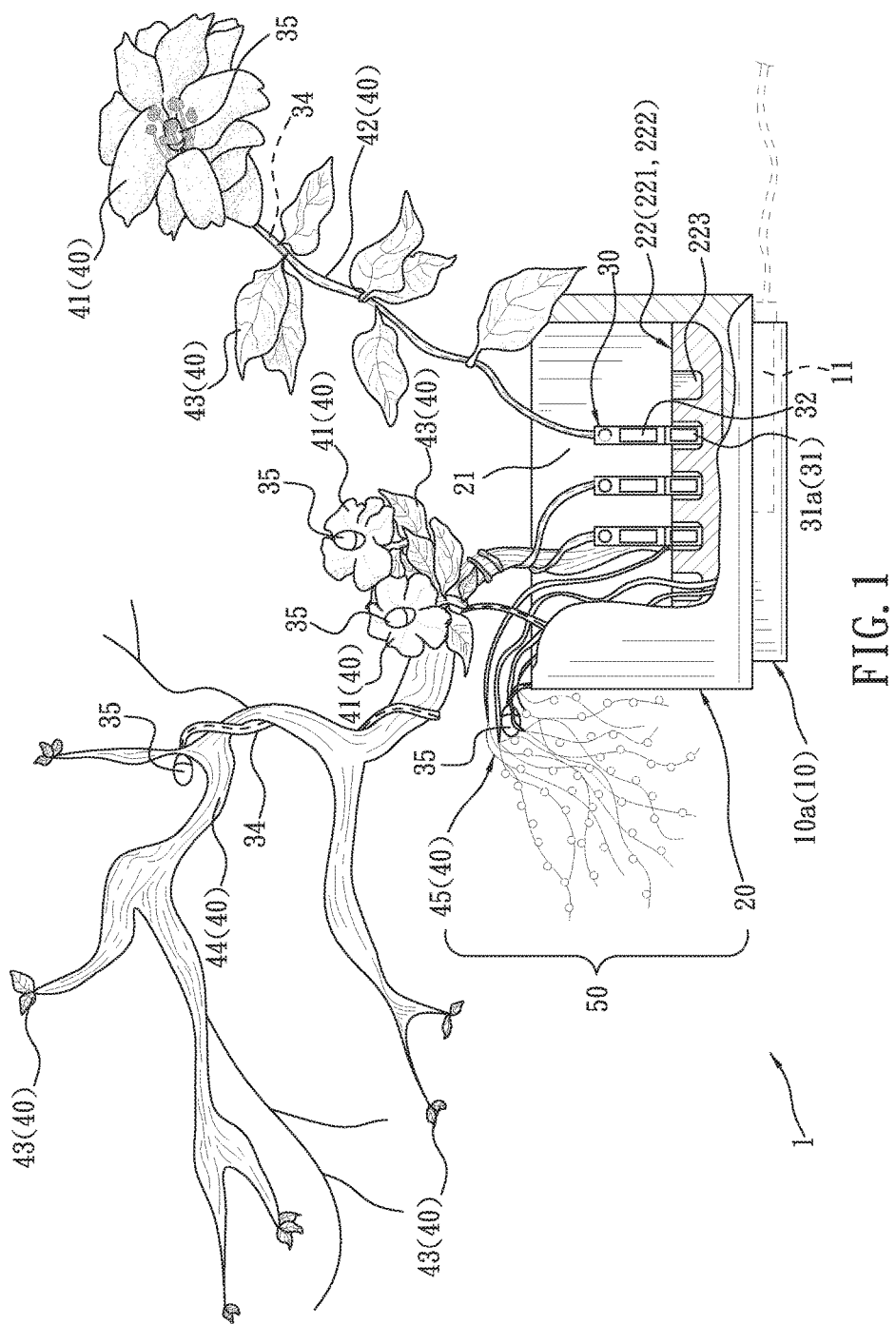
FIG. 1 is a perspective view of an embodiment (with an inductive wireless power supply) according to the present invention.
Figure 3:
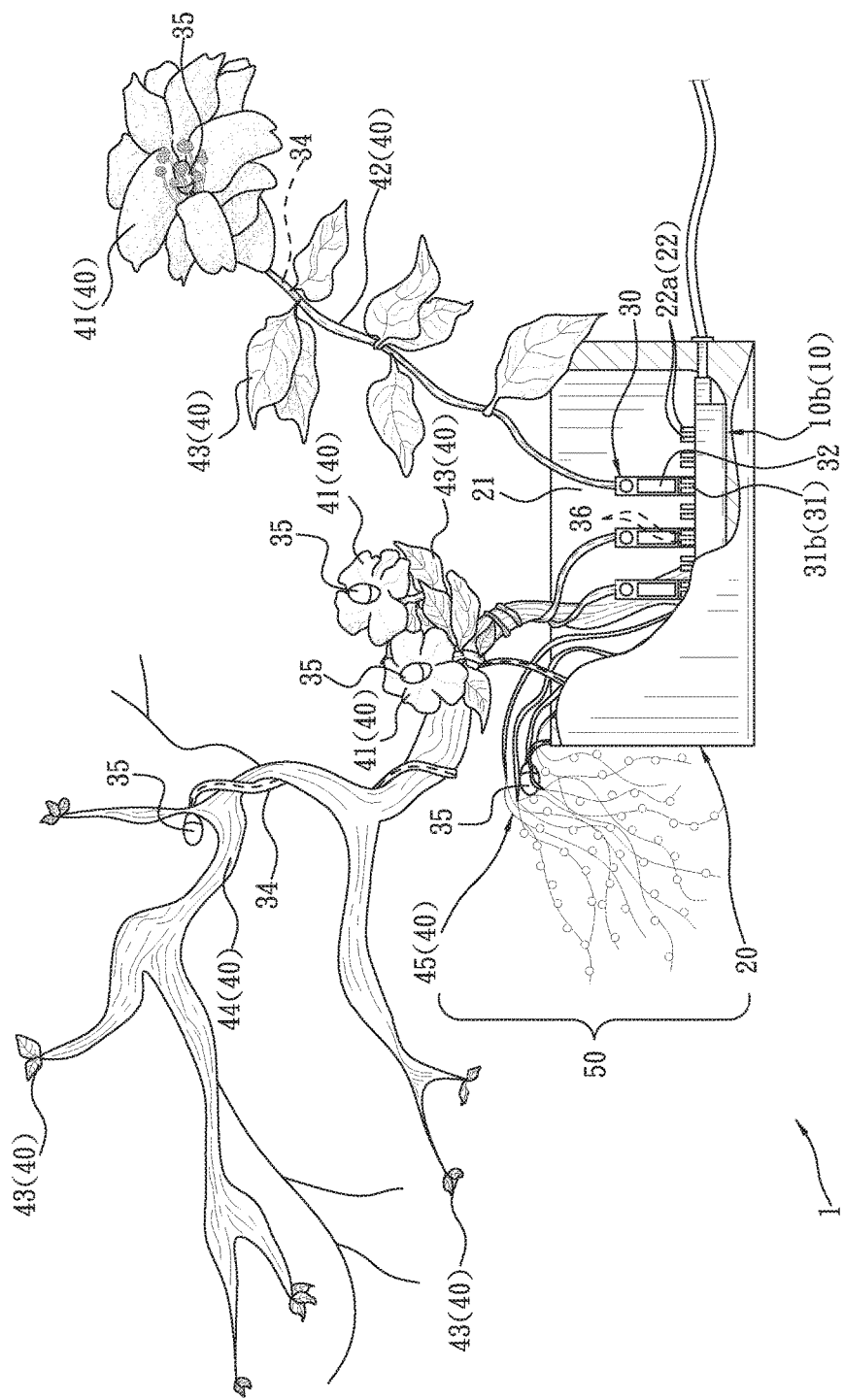
FIG. 3 is a perspective view of another embodiment (having a flower-frog-type power supply) according to the present invention.
Figure 9:
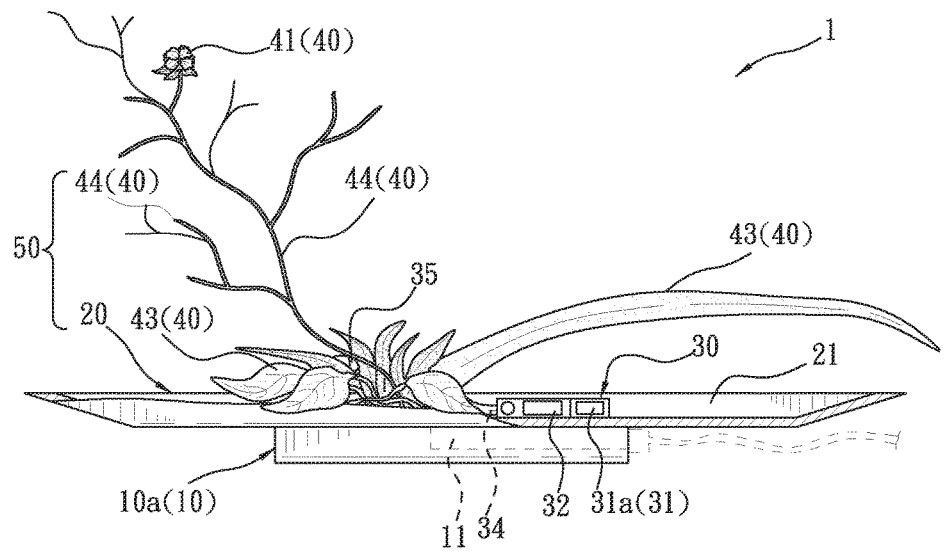
FIG. 9 is a perspective view of a further embodiment (having an inductive wireless power supply) according to the present invention.
Figure 10:
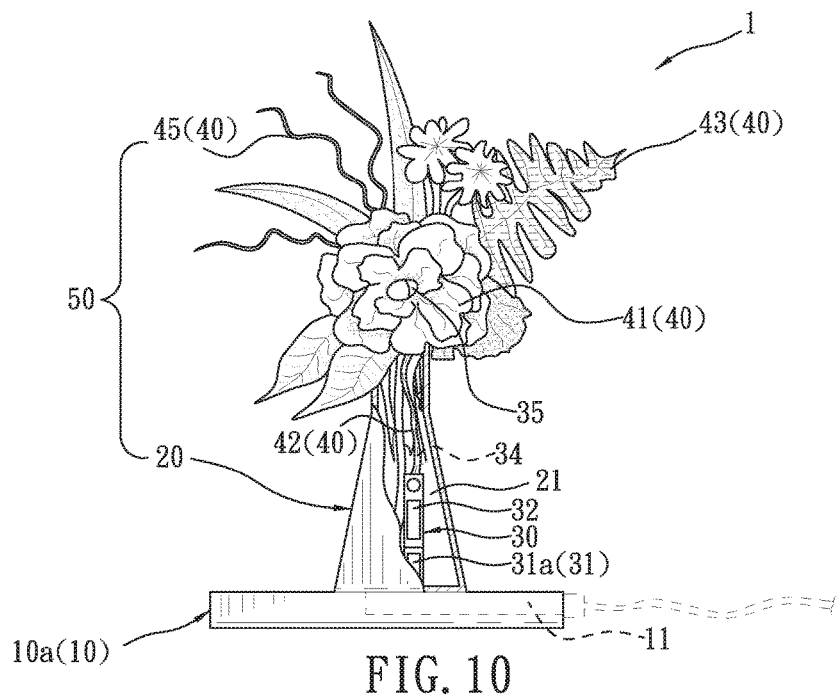
FIG. 10 is a perspective view of a further embodiment (with inductive wireless power supply) according to the present invention.

Refer to FIG. 1, FIG. 3. FIG. 9 and FIG. 10, a floral lighting system 1 that combines at least one creative floral arrangement with lighting according to the present invention includes a carrier 20, at least one floral unit 40, at least one light emitting diode (LED) module 30 and a power supply 10. A floral arrangement 50 is formed by the carrier 20 and the floral unit 40.

The shape of the carrier 20 is not limited. The carrier 20 includes a mounting space 21 therein and a loading portion 22 is formed in the mounting space 21.

The floral unit 40 formed by, but not limited to, real flowers or artificial flowers, is designed by florists (considered as manufacturers) or clients (considered as consumers). For example, the florist sets and fixes the bottom of different floral units 40 on the loading portion 22 inside the mounting space 21 of the carrier 20 so that the floral units 40 can be displayed through the mounting space 21 of the carrier 20 to form the creative floral arrangement 50. This improves artistic value and spatial aesthetics of the present floral lighting system 1.

The LED module 30 is arranged at the loading portion 22 of the carrier 20 and including at least one LED 35, at least one power supply unit 31 for providing electricity the LED 35 requires to emit light, at least one wireless control unit 32, and at least one wire unit 34 connected between the power supply unit 31 and the LED 35. The wireless control unit 32 allows clients to control various functions of the LED module 30 including light color, power on/off, lighting pattern (such as flashing), etc. wirelessly from a distance by using an external electronic device 33 (as shown in FIG. 11).

Figure 2:
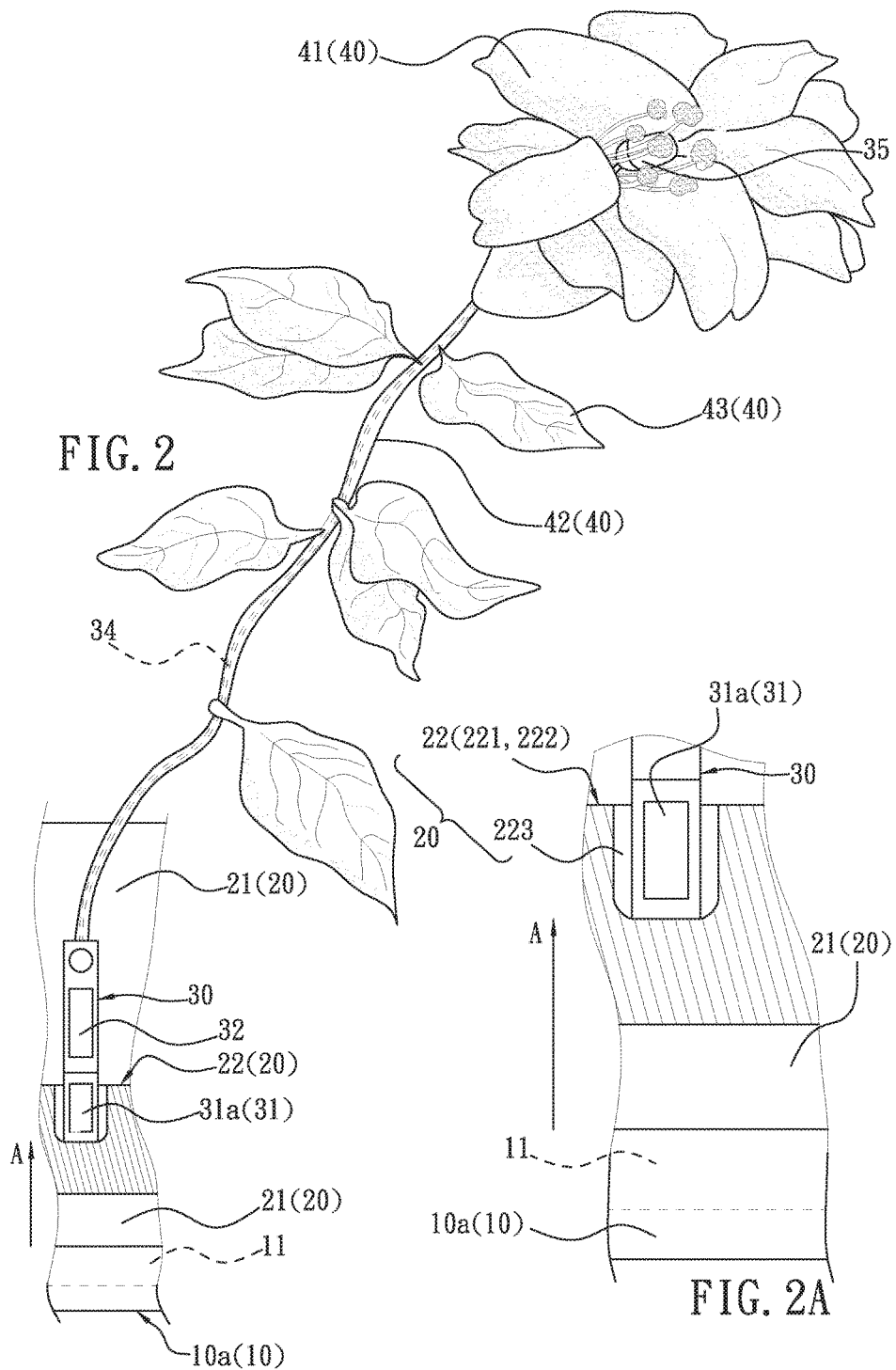
FIG. 2 is a partial enlarged view of the embodiment in FIG. 1 according to the present invention.

The power supply 10 provides power to the power supply unit 31 (as the arrow A in FIG. 2 and FIG. 2A indicates) of the LED module 30.

Figure 5:
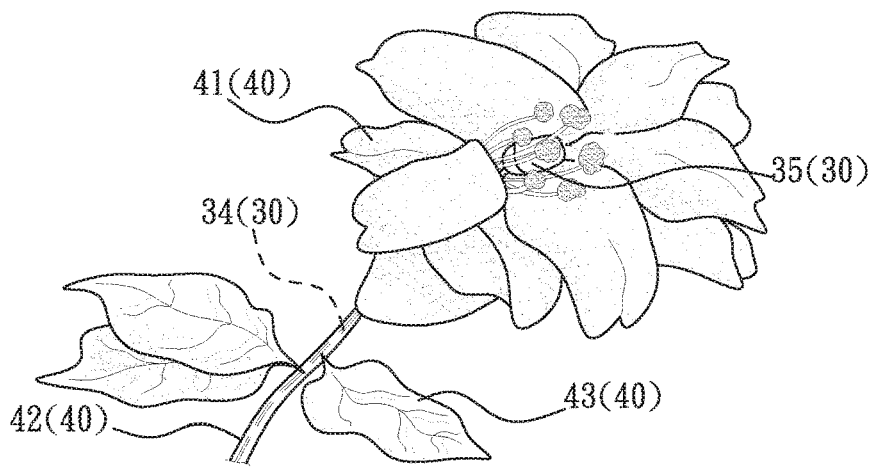
FIG. 5 is a schematic drawing showing a wire unit of a LED module embedded in a floral unit of an embodiment according to the present invention.
Figure 6:
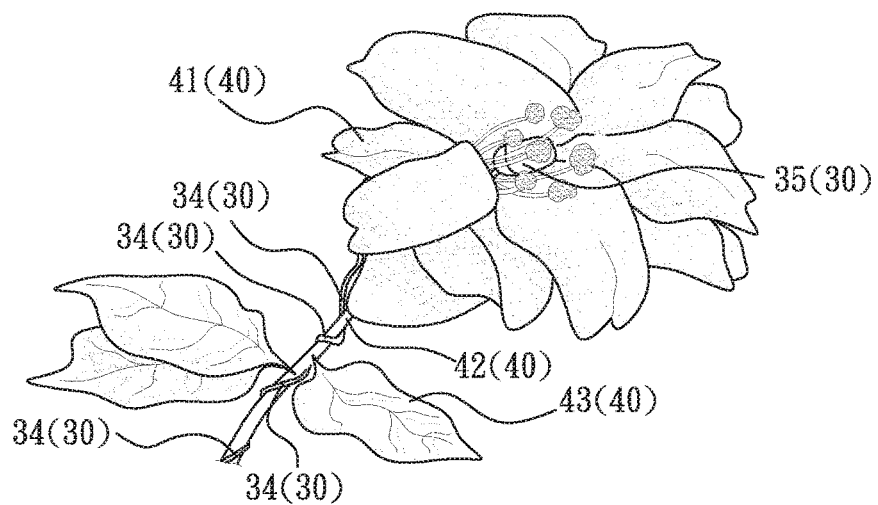
FIG. 6 is a schematic drawing showing a wire unit of a LED module wound around a floral unit of an embodiment according to the present invention.
Figure 7:
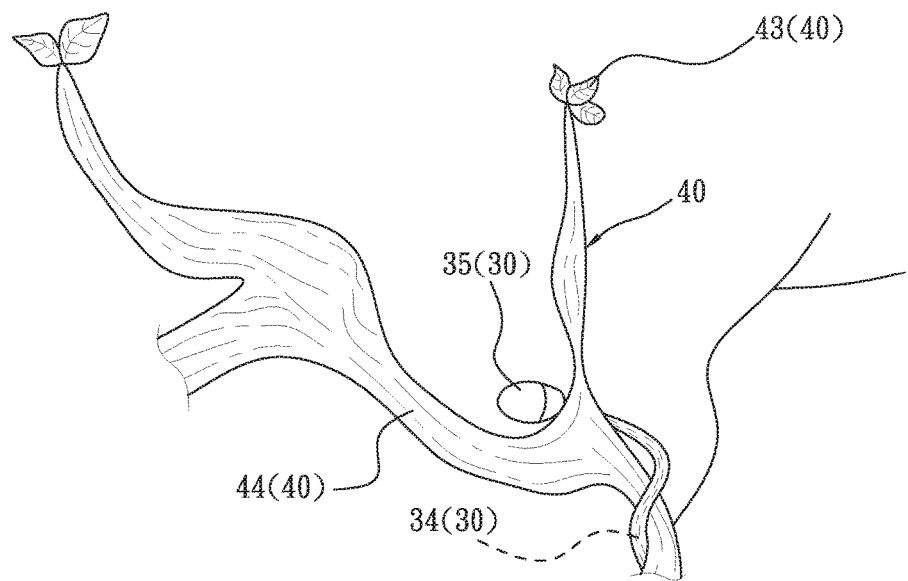
FIG. 7 is a schematic drawing showing a partial enlarged view of the embodiment in FIG. 1 and FIG. 3 according to the present invention.
Figure 8:
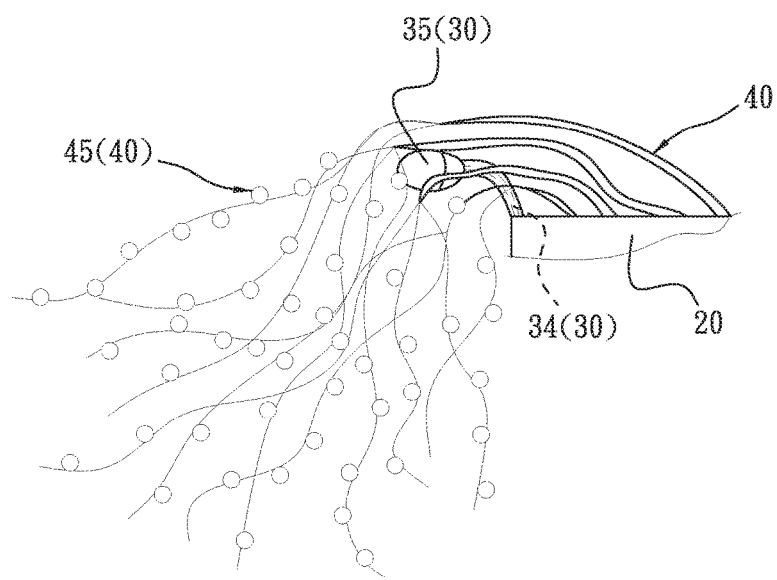
FIG. 8 is a schematic drawing showing a partial enlarged view of the embodiment in FIG. 1 and FIG. 3 according to the present invention.

The wire unit 34 of the LED module 30 is wound around the floral unit 40 (as shown in FIG. 6 and FIG. 7) or inserted into the floral unit 40 (as shown in FIG. 5) to be integrally connected to the floral unit 40.

Figure 11:
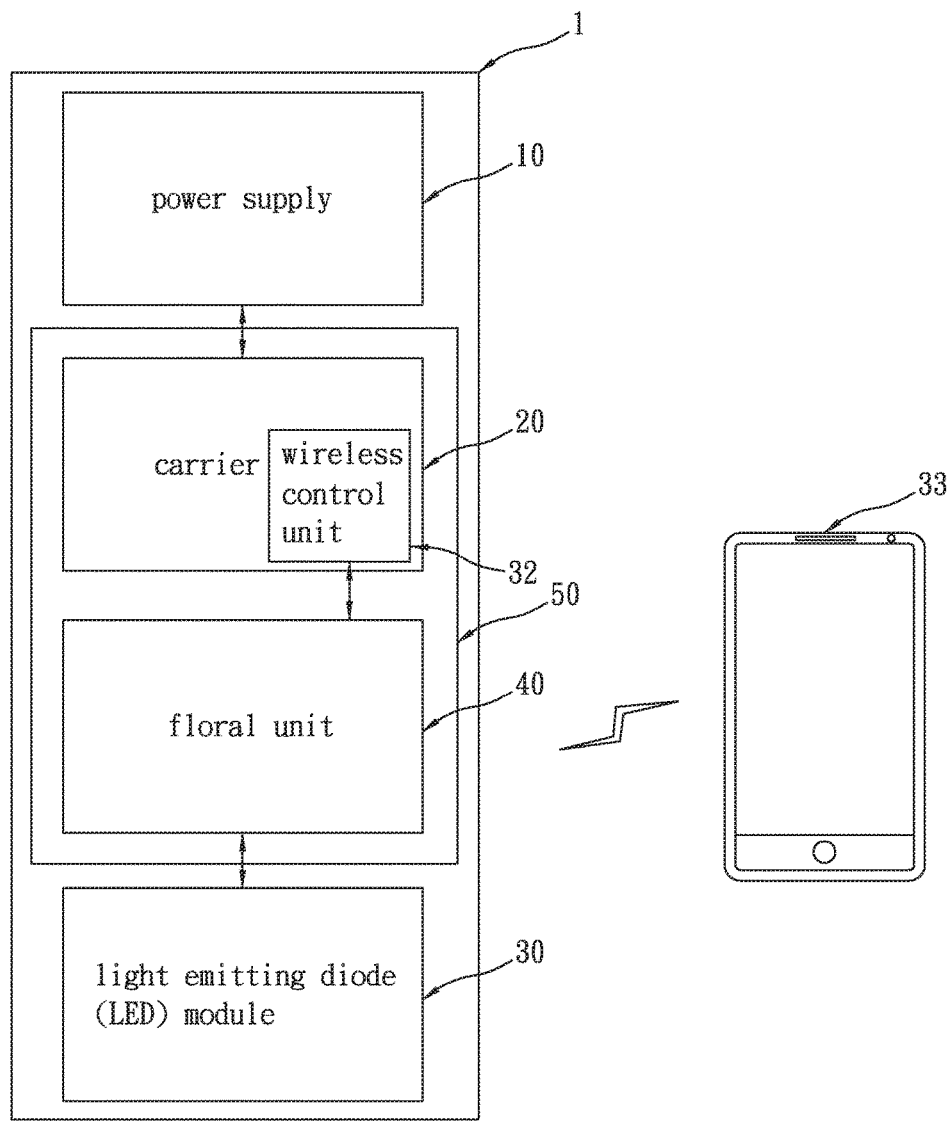
FIG. 11 is a schematic drawing showing an embodiment under control of an external electronic device according to the present invention.

While the present floral lighting system 1 being used, the florist or the client can operate the external electronic device 33 (as shown in FIG. 11) to change the functions of the LED module 30 including light color, power on/off, lighting pattern, etc. in a wireless way. Thus different kinds of dynamic lighting are provided by the LED 35 of the LED module 30 together with the creative floral arrangement 50 on the carrier 20. The floral lighting system 1 that combines creative floral arrangements with lighting is generated.

As shown in FIG. 1 and FIG. 3, the floral unit 40 can be a flower 41, a stein 42, a leaf 43, a branch 44, grass 45 or a combination thereof.

As shown in FIG. 1 and FIG. 3, the wire unit 34 of the LED module 30 can be embedded in the flower 41, the stein 42, the leaf 43, the branch 44, the grass 45, or a combination thereof.

As shown in FIG. 1 and FIG. 3, the LED 35 of the LED module 30 can be inserted into the flower 41, the stein 42, the leaf 43, the branch 44, the grass 45, or a combination thereof.

The carrier 20 can be, but not limited to a plate, a bowl, a bottle, a mug, a barrel or a basket. This helps to increase the variety and diversity of the floral lighting system 1.

Refer to FIG. 1, FIG. 2, FIG. 2A, FIG. 9 and FIG. 10, the power supply 10 is an inductive wireless power supply 10a and the carrier 20 is arranged at a top surface of the inductive wireless power supply 10a. The power supply unit 31 of the LED module 30 is an inductive wireless power supply unit 31a which is charged by the inductive wireless power supply 10a through electromagnetic induction (as the arrow A in FIG. 2, and FIG. 2A indicates).

Moreover, the loading portion 22 of the carrier 20 is arranged at a bottom of the mounting space 21 and including a fixing plate 221 (as shown in FIG. 1) or a foam body 222 (as shown in FIG. 1).

As shown in FIG. 1 and FIG. 2A, the loading portion 22 is a fixing plate 221 that includes a plurality of holes 223 for allowing the inductive wireless power supply unit 31a to be inserted and fixed therein.

Refer to FIG. 1 and FIG. 2A, that loading portion 22 is the foam body 222 provided with a plurality of holes 223 that allow the inductive wireless power supply unit 31a to be inserted and fixed therein. The foam body 222 provides water absorbency and air permeability due to a lot of holes included therein. The foam body 222 absorbs water and provides water to the at least one floral unit 40 (real flowers) thereon so that a bottom of the floral unit 40 can keep breathing.

Furthermore, the inductive wireless power supply 10a further includes a rechargeable battery so that the floral lighting system 1 can still be used in an environment where no power is available.

Figure 4A:
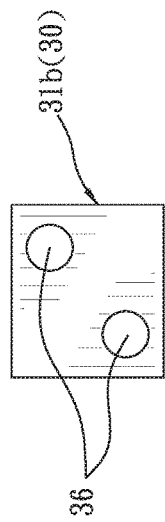
FIG. 4A is a schematic drawing showing a partial enlarged bottom view of a power socket unit of the embodiment in FIG. 4 according to the present invention.
Figure 4B:
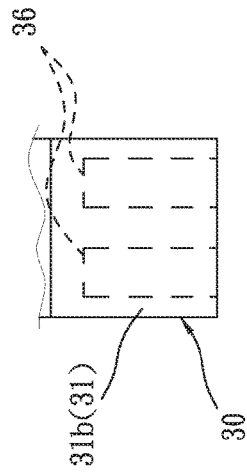
FIG. 4B is a schematic drawing showing a partial enlarged side view of a power socket unit of the embodiment in FIG. 4 according to the present invention.
Figure 4C:
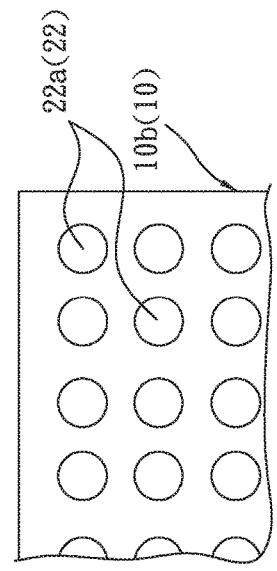
FIG. 4C is a schematic drawing showing a partial enlarged top view of a flower-frog-type power supply of the embodiment in FIG. 4 according to the present invention.

Refer to FIG. 3, FIG. 4 and FIG. 4A-4C, the power supply 10 is a flower-frog-type power supply 10b. The loading portion 22 of the carrier 20 is arranged at a top surface of the power supply 10 and is integrally connected to the power supply 10 to form the flower-frog-type power supply 10b. The loading portion 22 on the flower-frog-type power supply 10b includes a flower frog that is formed by a plurality of pin-shaped plugs 22a whose positive and negative electrodes are arranged in alternating pattern. The plurality of pin-shaped plugs 22a form a matrix layout on a top surface of the flower-frog-type power supply 10b, as shown in FIG. 4C.

Figure 4:
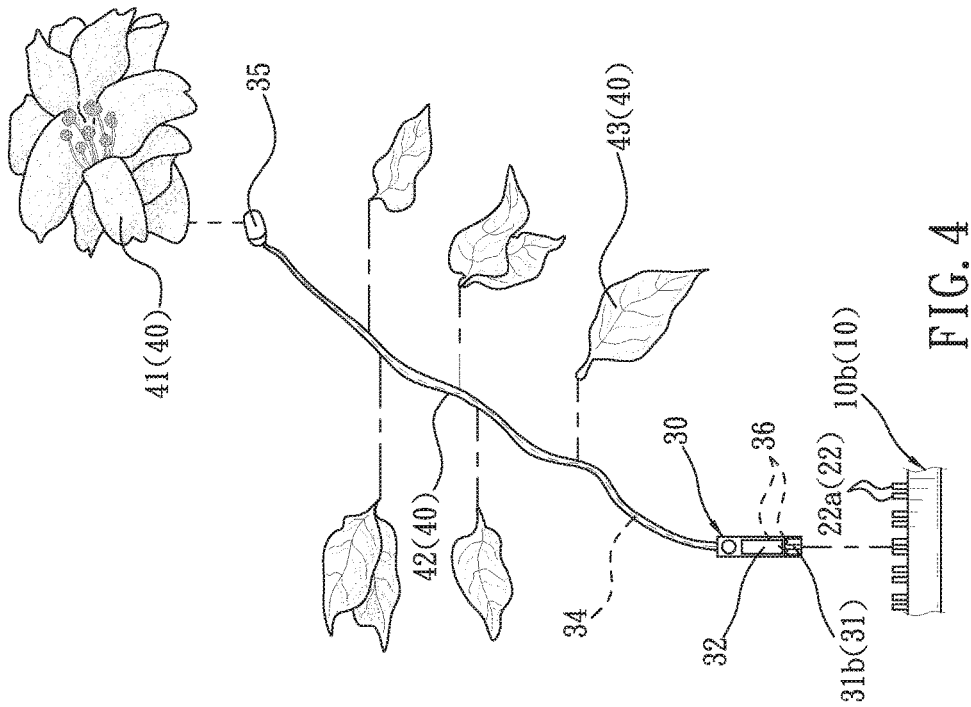
FIG. 4 is a partial enlarged view of the embodiment in FIG. 3 according to the present invention.

Refer to FIG. 4, the power supply unit 31 of the LED module 30 further forms a power socket unit 31b whose lower end is arranged with two holes 36 that allow the positive and the negative electrodes to be plugged therein respectively, as shown in FIG. 4A and FIG. 4B. Thereby the power socket unit 31b can be charged or powered by the positive and negative electrodes of the pin-shaped plug 22a of the flower-frog-type power supply 10b being plugged into the two holes 36 thereof.

While in use, the floral lighting system 1 of the present invention has the following advantages compared with the flower lights available now:

(1) There is no limit on types and/or the amount of both the carrier 20 and the floral unit 40. In the present floral lighting system 1 that combines the creative floral arrangements 50 with the lights (30), the flower types, the amount of flowers, and the disposition of the floral unit 40 can be selected or designed according to the florist's (manufacturer's end) creative concept, the client's (consumer's end) needs or their personal preferences. Thereby the variety or special characters of the creative floral arrangement 50 can be increased and the problems of conventional flower lights such as limited styles, wearisome constancy, lack of variety, etc. can be solved.

(2) The wireless control unit 32 allows florists (manufacturer's end) or clients (consumer's end) to control functions of the LED module 30 including light color, lighting pattern, etc. wirelessly by using an external electronic device 33 (such as an application set on a mobile phone). Thus the problems of lack of variety or difficulty in renewal of conventional flower lights can be solved.

(3) While in use, the creative floral arrangements 50 and/or the lights (30) are first designed and manufactured by florists according to the client's requirements and then the floral lighting system 1 generated is used by the clients. Thus a service module or a trading scheme for periodic replenishment or maintenance can be set up between florists and clients. For example, florists help clients to maintain normal operation of the floral lighting system 1 or renew the creative floral arrangements 50 periodically according to the clients' needs. The renewal means to change flower types, the amount of the flowers or the disposition of the floral unit 40, or the colors or the lighting patterns of the LED module 30. Therefore the present system satisfies customers' needs for novelty and variety.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

What is claimed is:

1. A floral lighting system that combines at least one creative floral arrangement with lighting comprising:
 a carrier having a mounting space therein and a loading portion in the mounting space;
 at least one floral unit having real flowers or artificial flowers and a bottom thereof being mounted on the loading portion in the mounting space of the carrier to be displayed through the mounting space and forming the creative floral arrangement together with the carrier;
 at least one light emitting diode (LED) module arranged at the loading portion of the carrier and including at least one LED, at least one power supply unit for providing electricity the LED requires to emit light, at least one wireless control unit allowing users to control functions of the LED module wirelessly by using an external electronic device, and at least one wire unit connected between the power supply unit and the LED; and
 a power supply that provides power to the power supply unit of the LED module;
 wherein the wire unit of the LED module is wound around the floral unit or inserted into the floral unit to be integrally connected to the floral unit;
 wherein the functions of the LED module including light color, power on/off, and lighting pattern are controlled wirelessly by the external electronic device outside the floral lighting so that the LED of the LED module shows various kinds of lighting on the creative floral arrangement; and
 wherein the power supply is an inductive wireless power supply and the carrier is arranged at a top surface of the inductive wireless power supply; wherein the power supply unit of the LED module is an inductive wireless power supply unit which is charged by the inductive wireless power supply through electromagnetic induction.

2. The system as claimed in claim 1, wherein the loading portion of the carrier is arranged at a bottom of the mounting space and including a fixing plate; a plurality of holes that allows the inductive wireless power supply unit to be inserted therein is disposed on the fixing plate.

3. The system as claimed in claim 1, wherein the loading portion of the carrier is arranged at a bottom of the mounting space and including a foam body arranged with a plurality of holes that allows the inductive wireless power supply unit to be inserted therein.

4. The system as claimed in claim 1, wherein a rechargeable battery is disposed on the inductive wireless power supply.

5. The system as claimed in claim 1, wherein the loading portion of the carrier is arranged at a top surface of the power supply and is integrally connected to the power supply to form a flower-frog power supply; the loading portion on the flower-frog power supply includes a flower frog that is formed by a plurality of pin-shaped plugs whose positive and negative electrodes are arranged in alternating pattern; the plurality of pin-shaped plugs form a matrix layout on a top surface of the flower-frog power supply.

6. The system as claimed in claim 5, wherein the power supply unit of the LED module is a power socket unit arranged with two holes that allow the positive and the negative electrodes of the plug of the flower-frog power supply to be plugged therein respectively for charging or powering.

7. The system as claimed in claim 1, wherein the floral unit is selected from the group consisting a flower, a stem, a leaf, a branch, grass or a combination thereof.

8. The system as claimed in claim 7, wherein the wire unit of the LED module is embedded in the flower, the stem, the leaf, the branch, the grass, or the combination thereof.

9. The system as claimed in claim 7, wherein the LED of the LED module is inserted into the flower, the stem, the leaf, the branch, the grass, or the combination thereof.

* * * * *